(No Model.)

J. SHERIDAN.
MANUFACTURE OF SPOONS AND FORKS.

No. 269,726. Patented Dec. 26, 1882.

WITNESSES:
Donn Twitchell
C. Sedgwick

INVENTOR:
J. Sheridan
BY Munn & Co
ATTORNEYS.

UNITED STATES PATENT OFFICE.

JOSEPH SHERIDAN, OF JERSEY CITY, NEW JERSEY.

MANUFACTURE OF SPOONS AND FORKS.

SPECIFICATION forming part of Letters Patent No. 269,726, dated December 26, 1882.

Application filed June 21, 1882. (No model.)

*To all whom it may concern:*

Be it known that I, JOSEPH SHERIDAN, of Jersey City, in the county of Hudson and State of New Jersey, have invented a new and useful Improvement in the Manufacture of Spoons and Forks, of which the following is a full, clear, and exact description.

This invention consists in a novel method of and means for forming and cutting, with a shear cut, spoon, ladle, and fork blanks by one and the same operation, and whereby the barb, fin, or selvage is removed at the same time, and the blank is delivered in the required bent form of the article to be produced, and so that it conforms to the shape of the curved die in which it is afterward struck up or embellished.

Reference is to be had to the accompanying drawings, forming part of this specification, in which similar letters of reference indicate corresponding parts in all the figures.

Figure 1:
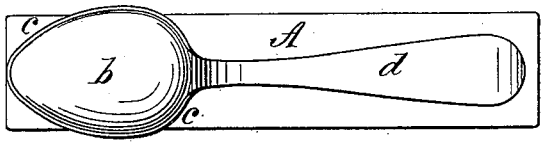
Figure 2:
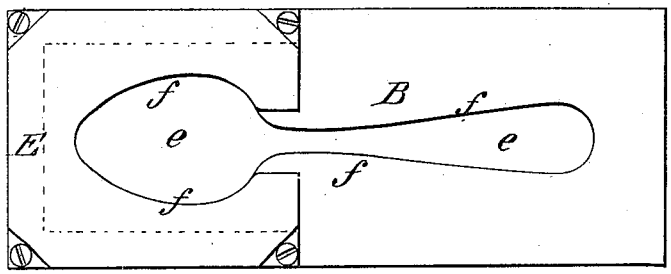
Figure 3:
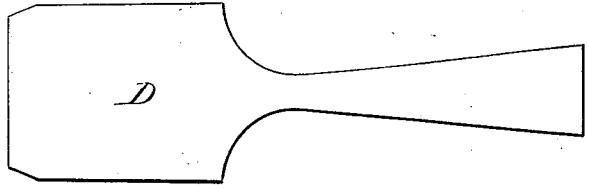
Figure 4:
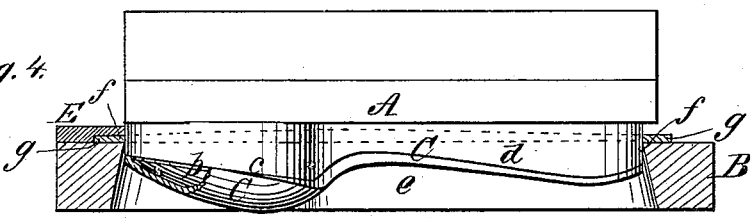
Figure 5:
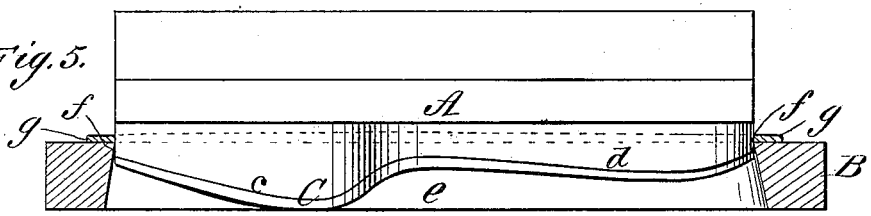
Figure 6:

Figure 1 represents an inverted plan or face view of a male forming and cutting die for making spoons; Fig. 2, a top or face view of a corresponding female die with a blank-holder attached; Fig. 3, a face view of a flat spoon-blank suitable for being operated on by the male and female dies shown in Figs. 1 and 2; and Fig. 4, a longitudinal vertical section of the female die and side view of the male die in operation, and after they have formed and cut the spoon-blank to its required curved shape. Fig. 5 is a similar view to Fig. 4 of a pair of dies suitable for making forks as in operation and after they have formed and cut the fork-blank to its required shape; and Fig. 6, a face view of the fork-blank.

It may here be stated in advance that the invention is not restricted to any particular spoons, ladles, or forks, nor yet to any particular kind of metal used in the production of such articles.

Referring in the first instance to Figs. 1, 2, 3, and 4 of the drawings, A represents the male die, which is both a former and cutter, and B the female die or cutter. The operating portion of the male die A, which projects down within the female die or cutter, is made to conform on its under side or face to the concave surface of the bowl of the spoon and upper or front surface of the handle, the same being made with a bowl-former, $b$, having a cutting-edge, $c$, and a handle former and cutter, $d$. The marginal configurations of the cutting-edge $c$ and of the former and cutter $d$ correspond with the marginal configuration of the spoon or curved spoon-blank C to be produced.

The female die B may be made flat on its face, and be simply formed with an aperture, $e$, through it, corresponding on its upper edge, $f$, which is the cutting-edge of said die or female cutter, with the marginal configuration of the curved spoon-blank to be produced. Said aperture is of an enlarged beveling shape on its sides, from the cutting-edge $f$ downward, to give a sharp cutting-edge to said die and ready clearance for the work.

The work is introduced in the shape of a flat and suitably drawn or hammered blank, D, of sufficient size to leave a surplus of metal beyond what is necessary to form the curved blank C, so that it may have a proper and firm support on the upper face of the female die or cutter B, upon which it is laid. The blank D being thus placed upon the die or cutter B, the upper or male die, A, is brought down, and its portions $b$, $c$, and $d$ caused to form and cut at the same time the curved blank C out of the flat blank D, and to deliver it through the aperture $e$ of the female die B, leaving the selvage or fin $g$ behind it on the top of said die B. In this operation it will be observed that the cutting-edges of the male die A are in varying lines or planes corresponding with the face or front of the curved spoon-blank, and when in operation are never simultaneously all in line with the cutting-edge $f$ of the female die B, so that they act with a succession of shear cuts on the flat spoon-blank, thereby not only easing the cutting operation, but holding on to the blank at different points while it is being formed, as well as cut, to produce the curved blank C, which is delivered free from the barb, fin, or selvage, and may be afterward trimmed, or at once be transferred to the curved die, in which it is subsequently struck up or embellished.

For light work—as, for instance, in the manufacture of small spoons—the metal of the flat or plain blank around or about the bowl portion may be inserted within or under a marginal holder, E, to keep the metal from buckling when the dies A B are in operation.

In Fig. 5 the operation of the dies A B is the same upon a plain or flat blank to produce a curved fork-blank, C, as it was in the case of producing a curved spoon-blank, and the cutting-edges of said dies are substantially the same, only varying in shape according to the article to be made. The tines may be afterward formed in this curved fork-blank without risk of bending them out of shape. Ladles, which are virtually spoons, are produced in the same manner.

Having thus described my invention, I claim as new and desire to secure by Letters Patent—

1. The method of producing spoon and fork blanks of the required facial curvatures and marginal configurations of the spoons and forks to be made by simultaneously pressing or forming and cutting them by a succession of shear cuts from a flat or plain blank and removing the fin or selvage in such operation, substantially as specified.

2. The combination of the male die or former and cutter A, of the same facial and marginal configuration on its operating surface and cutting-edges as the curved spoon or fork blank to be produced, and the female die or cutter B, having an aperture through it formed with cutting-edges which are of the same marginal configuration as said blank and cutting-edges of the male die, but which have a different or flat facial configuration, essentially as and for the purposes herein set forth.

3. The marginal holder E for the bowl or larger portion of the blank, in combination with the male former and cutter A, having a facial and marginal configuration corresponding with that of the curved blank to be produced, and the female die or cutter of like marginal configuration with the cutting-edges of the male die, but of different facial configuration thereto, essentially as described.

JOSEPH SHERIDAN.

Witnesses:
  A. GREGORY,
  C. SEDGWICK.